INVENTOR
Gerard A. DeVlieg
BY
ATTORNEYS

March 10, 1931.  G. A. DE VLIEG  1,796,189
GRINDING MACHINE
Filed Nov. 19, 1923   3 Sheets-Sheet 3
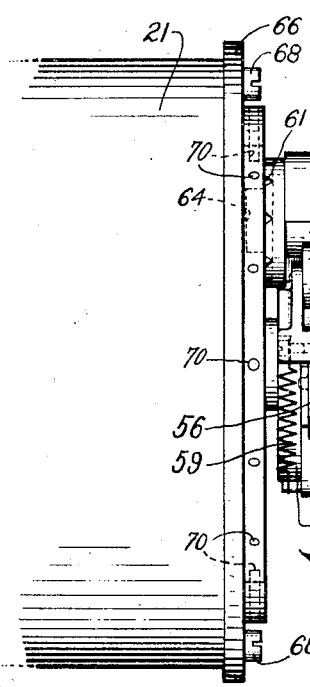
Fig. 4.
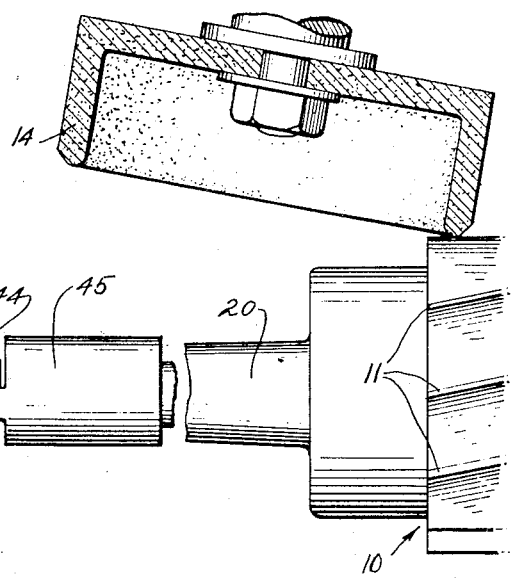
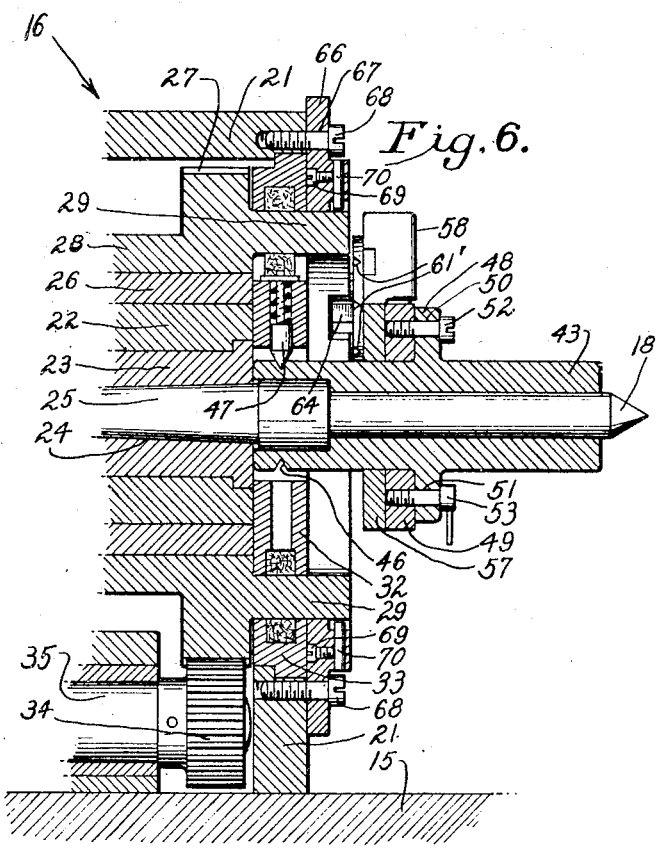
Fig. 6.
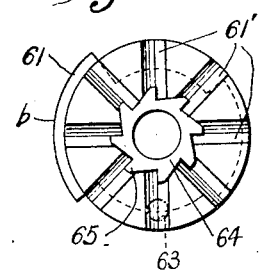
Fig. 5.
Fig. 7.
INVENTOR
Gerard A. DeVlieg
BY
ATTORNEYS Patented Mar. 10, 1931

1,796,189

UNITED STATES PATENT OFFICE

GERARD A. DE VLIEG, OF ROCKFORD, ILLINOIS

GRINDING MACHINE

Application filed November 19, 1928. Serial No. 320,233.

The present invention relates to improvements in grinding machines, and particularly machines for grinding rotary cutters, such as reamers, having a plurality of peripherally spaced cutting elements or blades.

Cutters may have either uniformly spaced or unevenly spaced cutting elements. Heretofore, various types of automatic or semi-automatic grinding machines have been provided for grinding cutters with evenly spaced cutting elements.

In one type of grinding machine, the cutter is reciprocated relatively across the grinding area of a suitable grinding wheel, and is indexed periodically to position different elements successively in the line of grinding contact. In another type of grinding machine, to which the present invention is particularly applicable, and which is adapted primarily for grinding cutters, such as reamers, having generally longitudinal inclined blades, the cutter is reciprocated longitudinally across the grinding wheel and is rotated continuously in timed relation to the reciprocation so as to compensate for the inclination of each blade during the grinding stroke and to index different blades successively into the line of grinding contact. In each of the foregoing instances, consecutive blades may be presented to the grinding wheel, or one or more blades may be skipped in each indexing movement.

The primary object of the present invention resides in the provision of a new and improved grinding machine for automatically grinding cutters having unevenly spaced cutting elements.

In a cutter having a given number of unevenly spaced cutting elements, taking one of the elements as the starting point of a corresponding uniform division of space, certain of the other elements may be located at the division points, or back of said points, or in advance of said points. An important object of the present invention, therefore, resides in the provision in a grinding machine of novel means for automatically compensating for the spacing of the cutting elements from the points of uniform space division so as to present each element to the grinding wheel in the same position, i. e. at the same angle and in the same line of grinding contact.

A more specific object resides in the provision in a grinding machine having driving means for angularly indexing the cutter, of novel means automatically operable through each indexing movement to adjust the cutter angularly relative to the driving means so as to position the next blade to be ground in the line of grinding contact.

Still another object resides in the provision in a grinding machine having driving means for rotating a cutter having generally longitudinal, inclined blades continuously in one direction, of means for automatically adjusting the cutter angularly relative to the driving means so as to position the different blades successively in the line of grinding contact.

Other general objects reside in the provision of a novel grinding machine of the foregoing character which is simple and inexpensive in construction, which is efficient, automatic, and expeditious in operation, and which is adapted for grinding a large variety of cutters having different numbers of blades spaced in different ways.

Further objects and advantages will become apparent as the description proceeds.

In the accompanying drawings, Figure 1 is a fragmentary longitudinal sectional view of a machine embodying the features of my invention.

Figure 4 is a fragmentary plan view.

Figure 5 is a sectional view taken along line 5—5 of Figure 2.

Figure 6 is a fragmentary sectional view taken along line 6—6 of Figure 2.

Fig. 7 is a rear view of the cam shown in Fig. 5.

Figure 1:
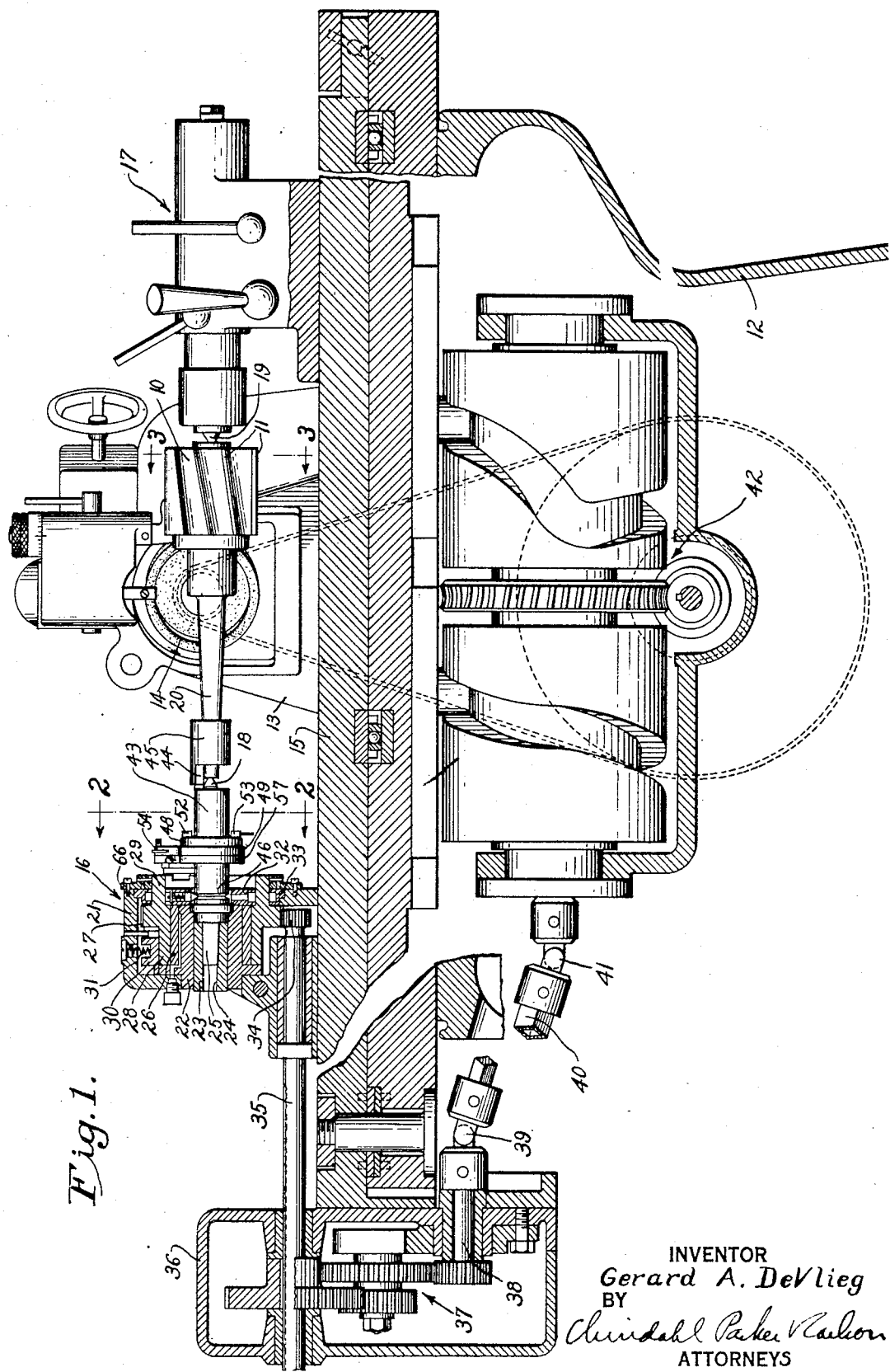

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its broadest concept, the invention is applicable to a large variety of grinding machines for grinding cutters of different types, and is directed to the automatic compensation of the indexing movements for the uneven spacing of the cutting elements without regard to whether or not the elements are on the periphery or end of the cutter, or are straight or helical, or are to be ground on the faces or the backs. However, referring more specifically to the accompanying drawings, I have shown for purposes of illustration, the preferred embodiment of the invention incorporated in a grinding machine of the type disclosed in my copending application Serial No. 109,222, filed May 15, 1926 for relief grinding the blades of rotary cutters such as reamers.

The cutter is shown at 10, and comprises a plurality, eight in the present instance, of generally longitudinal inclined blades 11 having helical cutting edges. These blades may be spaced in any desired manner, and in the present instance are arranged in pairs of diametrically opposed blades requiring the same angular setting. Thus, four different adjustments are required.

The grinding machine comprises generally a base 12 having a vertical standard 13 on the rear. Rotatably mounted in the vertical standard 13 is a grinding wheel 14 which preferably is cup-shaped, and which is inclined slightly from a perpendicular to the front of the machine so as to provide clearance.

Mounted for reciprocation on the front of the base 12 and transversely of the face of the grinding wheel 14 is a carriage 15 on the opposite ends of which are adjustably mounted a headstock 16 and a tailstock 17 having centers 18 and 19 respectively. An arbor 20 adapted to support the cutter 10 is mounted between the centers 18 and 19.

Preferably, the headstock 16 is formed with a housing 21 slidably adjusted on the carriage 15. Secured in the left wall of the housing 21 is a fixed sleeve 22. A socket member 23 is secured in the sleeve 22, and has a taper bore 24 in which the taper shank 25 of the work center 18 is disposed. Rotatably mounted on a bearing sleeve 26, fitting tightly over the sleeve 22, is a gear 27 having a hub 28 on its left end, and having an annular flange 29 on its right end, concentric with the center 18 and projecting out from the right end of the housing 21. To prevent back lash, a brake shoe 30 is pressed by a spring 31 against the hub 28 of the gear 27. The right end of the housing 21 is closed by concentric members 32 and 33, secured respectively to the sleeve 22 and the housing 21, and engaging respectively the inner and outer peripheral surfaces of the flange 29.

The gear 27 meshes with a pinion 34 on a horizontal shaft 35 which is adjustable with the headstock 16, and which extends slidably through a gear housing 36 mounted on the left end of the carriage 15. The shaft 35 is connected through a train of change speed gears 37 in the housing 36 to a stub shaft 38. The stub shaft 38 is connected through a universal joint 39 to an extensible shaft 40 which is connected through a universal joint 41 to a drive mechanism 42 (more fully described in said copending application) for reciprocating the carriage 15. As a result, the gear 27 is driven in timed relation to the reciprocation of the carriage 15.

Means is provided for operatively connecting the arbor 20 to the annular flange 29. This means preferably comprises a drive sleeve 43 which is rotatably mounted on or about the center 18, and which has an interlocking connection 44 with a dog 45 on the arbor 20. The inner end of a sleeve 43 has a peripheral notch 46 in which a spring pressed detent 47 mounted in the member 32 engages.

Formed on the periphery of the sleeve 43, intermediate its ends, is a flange 48. An adjusting ring 49 is rotatably mounted on the sleeve 43, and is adapted to be secured against one side of the flange 48. In the present instance, the flange 48 is formed with two diametrically opposed arcuate slots 50 and 51 through which clamp screws 52 and 53 are threaded into the ring 49 to secure the latter in adjusted position. The ring 49 is formed with a laterally projecting arm 54. Secured in the end of the arm 54, as by means of a set screw 55 is a bearing block 56.

Freely rotatable on the sleeve 43 against the inner face of the ring 49 is a ring 57 having a laterally projecting arm 58 disposed across or in opposed relation to the arm 54 and the bearing block 56. A coil spring 59 anchored at its opposite ends in the arms 54 and 58 serves to hold the arm 58 yieldingly in engagement with the block 56. Rotatably mounted in the arm 58 opposite the block 56 is a cam roller 60.

Figure 2:
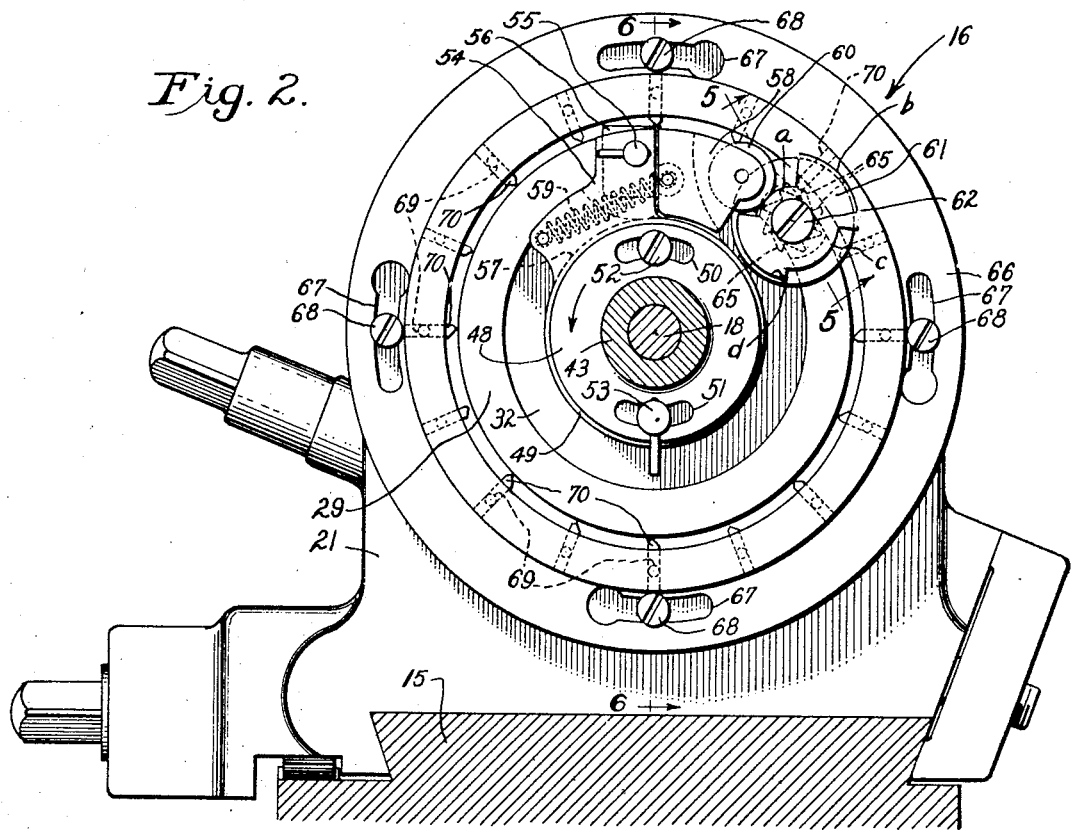
Figure 2 is a sectional view taken along line 2—2 of Figure 1.

A cam member 61 of suitable form is adjustably mounted on the flange 29, and engages the cam roller 60. In the present instance, the cam member 61 is rotatable on a stud 62 threaded into the end of the flange 29. Referring to Figure 2, it will be evident that rotation of the flange 29 in the direction of the arrow will act through the cam member 61, the cam roller 60, the arms 58 and 54, and the sleeve 43 to rotate the arbor 20.

Means is provided for angularly adjusting the arbor 20 relatively to the drive flange 29 to correctly position each blade 11 in the line of grinding contact. To this end, the cam member 61 is provided with a plurality of cam faces located respectively at different distances from a common point, which in the present instance is the center of rotation. The number of cam faces and the relative location thereof is dependent on the number and the spacing of the blades 11. For cutters having the same number of blades in which the blades are spaced differently, different cam members 61 may be substituted. Each cam face may serve one or more blades. It may be stated that the number of blades is always a multiple of the number of cam faces. In the present instance, the cam member 61 is provided with four peripherally spaced cam faces a—b—c—d having different radii. Consecutive cam faces are adapted to serve consecutive blades, and consecutive blades are adapted to be ground successively, and hence the cam member will be adjusted through two revolutions while the cutter is rotated through one revolution. It will be understood however that the arrangement of the cam faces may be varied, even for a given cutter, and that in the broadest concept of the invention, the only requisite is the provision of means for accurately locating each blade. Thus, consecutive cam faces might serve spaced blades, spaced cam faces might serve consecutive or spaced blades, or one cam face might serve two or more consecutive blades. The cam faces act through engagement with the roller 60 to adjust the arbor 20 for each blade when it is to be ground so as to compensate for the uneven spacing of the blades, i. e. for the departure of the blades from a uniform spacing.

A plurality of radial notches 61', two for each cam face, are formed in the inner end of the cam member 61, and are adapted to be selectively engaged by a spring pressed detent 63 in the flange 29.

Any suitable means may be provided for adjusting the cam member 61. Obviously, the member 61 may be adjusted manually. Preferably, means is provided for automatically adjusting or indexing the cam member 61 for each blade. In the present instance, this means comprises an index ratchet 64 rotatable with the cam member 61 and having a plurality of teeth 65 in peripherally spaced relation. Rigidly secured to the housing 21 is a ring 66 embracing the outer periphery of the flange 29. The ring 66 is rotatably adjustable by reason of a plurality of arcuate slots 67 through which retaining screws 68 extend. Adjustably secured in the ring 66 as by set screws 69 and projecting inwardly therefrom are a plurality of peripherally spaced pins 70 for engaging the teeth 65 to index the cam member 61 upon rotation of the flange 29. The degree of each indexing movement can be varied by adjusting the pins 70 in the ring 66. Any suitable number and arrangement of the pins 70 may be provided so long as the proper cam face for each cutter blade is indexed into engagement with the roller 60. Rings 66 with different numbers and/or arrangements of pins 70 may be substituted for different cutters. In the present instance, the pins 70 correspond in number to twice the number of the blades, and are evenly spaced, and the extent of each total indexing movement is 90°. However, each pin will rotate the cam member 61 through 45°, and the cam member will be actuated twice for each complete indexing movement.

Figure 3:
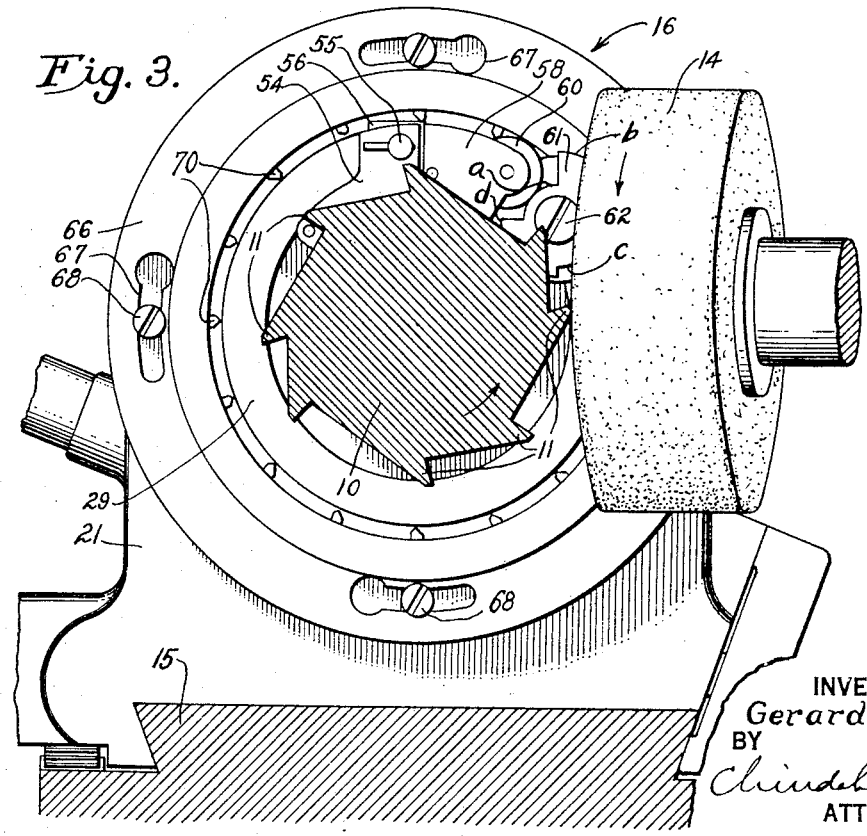
Figure 3 is a sectional view taken along line 3—3 of Figure 1.

In operation, a proper cam member 61 and a ring 66 having a proper number and arrangement of pins 70 for the cutter to be ground are provided. The cam face for the initial blade to be ground is brought into engagement with the cam roller 60, and the drive sleeve 43 is adjusted relative to the ring 49 to position said blade in the desired line of grinding contact. In the present instance, the initial blade is positioned to contact with the grinding wheel 14 at a point between the horizontal planes through the axes of the cutter and the wheel, as best shown in Fig. 3, so as to grind a clearance on the back of the blade. The ring 66 is adjusted to index the cam member 61 at the proper points.

The machine operation is now instituted, whereupon the cutter is reciprocated and is rotated continually in one direction in timed relation to the reciprocation. The continuous rotation serves to compensate for the inclination of each blade during its cutting stroke, and to position another blade into the grinding stroke during the return movement. After each blade is ground, the cam member 61 is indexed automatically to correctly position the blade next to be ground. In the present instance, the consecutive blades are ground successively, and after each blade is ground, two of the pins 70 index the cam member 61 through 90 degrees.

It will be evident that I have provided an automatic grinding machine for cutters having unevenly spaced blades. The machine also will grind cutters with evenly spaced blades. The construction is simple and relatively inexpensive, and the operation is expeditious and efficient.

I claim as my invention:

1. A grinding machine comprising, in combination, a grinding element, a rotary work support for a work piece having a plurality of peripheral work elements, certain of which are spaced unevenly, means for effecting a relative reciprocation between said grinding element and said support to carry the work elements across said grinding element, a drive connection for rotating the work piece in timed relation to said reciprocation, said connection including a cam engaging means and an adjustable cam having a plurality of cam faces adapted selectively to engage said engaging means, and means for automatically indexing said cam in timed relation to the rotation of the work piece.

2. A relief grinding machine comprising, in combination a grinding element, means for supporting a rotary work piece having a plurality of generally longitudinal, inclined peripherally spaced blades, said element being adapted to project into the circle of revolution of the work piece, means for relatively reciprocating said first mentioned means and said element longitudinally of the work piece, means for continuously rotating the work piece in timed relation to said reciprocation to compensate for the inclination of the blades and to move different blades successively into position to be ground, and means for automatically adjusting the work piece about its axis in accordance with the spacing of the blades so as to present different blades successively to said grinding element in a given line of grinding contact.

3. A grinding machine comprising, in combination, a grinding element, means for supporting a work piece having a plurality of peripherally spaced, longitudinally inclined blades, means for effecting a relative reciprocation between the work piece and said grinding element, and means operable in timed relation to said reciprocation for rotating the work piece in one direction, said last mentioned means including means for angularly adjusting the work piece to compensate for a departure of the blades from a uniform spacing.

4. A grinding machine comprising, in combination, a grinding element, means for supporting a work piece having a plurality of generally longitudinal, inclined, peripherally spaced cutting elements, means for relatively reciprocating said first mentioned means and said grinding element longitudinally of the work piece, a driving connection for continuously rotating the work piece in timed relation to said reciprocation to compensate for the inclination of the cutting elements and to move different cutting elements successively into position to be ground, and means for automatically adjusting said driving connection in accordance with the spacing of the cutting elements so as to present different cutting elements successively to said grinding element in a given line of grinding contact.

5. A grinding machine comprising, in combination, a grinding element, means for supporting a work piece having a plurality of generally longitudinal, inclined, peripherally spaced blades, means for relatively reciprocating said first mentioned means and said grinding element longitudinally of the work piece, means for continuously rotating the work piece in timed relation to the reciprocation to compensate for the inclination of the blades and to move different blades successively into position to be ground, and means rendered operable at evenly spaced points in said rotation to adjust the work piece in accordance with the spacing of the blades so as to position each blade in its turn accurately in the line of grinding contact.

6. A grinding machine comprising, in combination, a grinding element, means for supporting a work piece having a plurality of generally longitudinal, inclined, peripherally spaced work elements, means for relatively reciprocating said first mentioned means and said grinding element longitudinally of the work piece, means for continuously rotating the work piece in timed relation to said reciprocation to compensate for the inclination of the work elements and to present different work elements to the grinding element, and means for automatically adjusting the work piece to position each work element accurately in the line of grinding contact.

7. A grinding machine comprising, in combination, a grinding element, a rotary work support for a work piece having a plurality of peripheral work elements, certain of which are spaced unevenly, means for effecting a relative reciprocation between said grinding element and said support to carry the work elements across said grinding element, and means for automatically indexing the support in accordance with the spacing of the work elements and in timed relation to said reciprocation to present different work elements successively to said grinding element in successive reciprocation.

8. A grinding machine comprising, in combination, a grinding element, a support for a rotary work piece having a plurality of peripherally spaced, generally longitudinal blades, means for effecting a relative reciprocation between said element and said support longitudinally of the work piece, means for automatically indexing said support about the axis of the work piece in timed relation to said reciprocation, and means for compensating said indexing movement for differences in spacing between the blades so as to present each blade in its turn to said grinding element in a given line of grinding contact.

9. A machine tool comprising, in combination, a cutting element, a work support for an elongated rotary work piece, means for effecting a relative reciprocation between said element and said support, longitudinally of the work piece, and means for automatically indexing the work piece about its axis in predetermined relation to said reciprocation and through unequal distances whereby a plurality of unevenly spaced generally longitudinal cuts will be generated on the work piece.

10. A machine tool comprising, in combination, a cutting element, a support for a rotary work piece having a plurality of peripherally spaced, generally longitudinal blades, certain of which are spaced unevenly, means for effecting a relative reciprocation between said element and the work longitudinally of the latter, means for automatically indexing the work piece in even increments and in timed relation to said reciprocation, and means rendered operable by said indexing to modify said indexing movements to conform to the spacing of the blades.

11. A machine tool comprising, in combination, a cutting element, a rotary work support for a work piece having a plurality of peripherally spaced work elements, means for effecting a relative reciprocation between said cutting element and said support, means for automatically indexing said support in timed relation to said reciprocation, and means for automatically compensating the indexing movements in accordance with the spacing of the work elements so as to present the work elements successively to said cutting element.

12. A machine tool comprising, in combination, a cutting element, a work support for a work piece, means for effecting a relative reciprocation between said cutting element and said support, and means for automatically indexing the work piece in predetermined relation to said reciprocation and through unequal distances whereby a plurality of unevenly spaced cuts will be generated on the work piece.

13. A machine tool comprising, in combination, a cutting element, a work support for a rotary work piece having a plurality of peripheral elements, certain of which are spaced unevenly, means for effecting a relative reciprocation between said cutting element and said support to carry the work piece across said cutting element, and means for automatically indexing the work piece in accordance with the spacing of the work elements to present different work elements successively to said cutting element.

14. A grinding machine comprising, in combination, a grinding element, means including a headstock for supporting a rotary work piece, means for relatively reciprocating said first mentioned means and said grinding element axially of the work blank, said headstock comprising a rotary driving member, an adjustable cam on said driving member, cam engaging means coacting with said cam and adapted to be connected to the work piece, an index ratchet for said cam and a plurality of spaced lugs fixed about said driving member for actuating said ratchet, said lugs being adjustable to adjust the time and extent of movement of said ratchet, and means for rotating said driving member.

15. A machine tool comprising, in combination, a cutting element, a work support for a work piece, means for effecting a relative reciprocation between said cutting element and said support, means tending to rotate said work piece continuously in timed relation to the reciprocation thereof, and means for varying the effect of said rotating means on said work piece.

In testimony whereof, I have hereunto affixed my signature.

GERARD A. DE VLIEG.